United States Patent
Stauter et al.

(10) Patent No.: US 6,669,555 B2
(45) Date of Patent: Dec. 30, 2003

(54) NOZZLE COVER

(75) Inventors: Richie Charles Stauter, Fayetteville, NY (US); Robert Stephen Simeone, Bridgeport, NY (US); Yiming Yu, Syracuse, NY (US); David Christian Brondum, Cazenovia, NY (US)

(73) Assignee: Carrier Corporation, Farmington, CT (US)

( * ) Notice: Subject to any disclaimer, the term of this patent is extended or adjusted under 35 U.S.C. 154(b) by 33 days.

(21) Appl. No.: 09/934,505

(22) Filed: Aug. 22, 2001

(65) Prior Publication Data
US 2003/0037912 A1 Feb. 27, 2003

(51) Int. Cl.[7] .............................................. F24F 13/075
(52) U.S. Cl. ......................... 454/299; 165/54; 165/122
(58) Field of Search ............................. 165/54, 56, 57, 165/121, 122; 454/299, 297; 62/239

(56) References Cited

U.S. PATENT DOCUMENTS

| | | | | |
|---|---|---|---|---|
| 3,590,218 A | * | 6/1971 | Steiner | 392/363 |
| 3,834,453 A | * | 9/1974 | Johansson | 165/54 |
| 3,877,356 A | * | 4/1975 | Bruns | 454/299 |
| 4,072,187 A | * | 2/1978 | Lodge | 165/48.1 |
| 4,392,048 A | * | 7/1983 | Carter | 392/370 |
| 4,644,135 A | * | 2/1987 | Daily | 392/363 |
| 6,497,112 B1 | * | 12/2002 | Simeone et al. | 62/407 |

* cited by examiner

Primary Examiner—Allen Flanigan
(74) Attorney, Agent, or Firm—Wall Marjama & Bilinski LLP

(57) ABSTRACT

A mobile temperature controlled container having an enclosed indoor section that closes against the one wall of the container. A blower wheel compartment is contained within the housing which has a spiral-shaped lower section that communicates with an upper discharge section. A blower wheel is mounted within the lower section of the compartment and the front of the enclosure is closed by a cover. The cover contains a circular inlet opening adjacent the blower wheel and a rectangular outlet nozzle located adjacent the discharge section of the compartment. The nozzle is arranged to discharge conditioned air into the container and has a vane thereon for optimizing the discharge flow into the container.

3 Claims, 6 Drawing Sheets

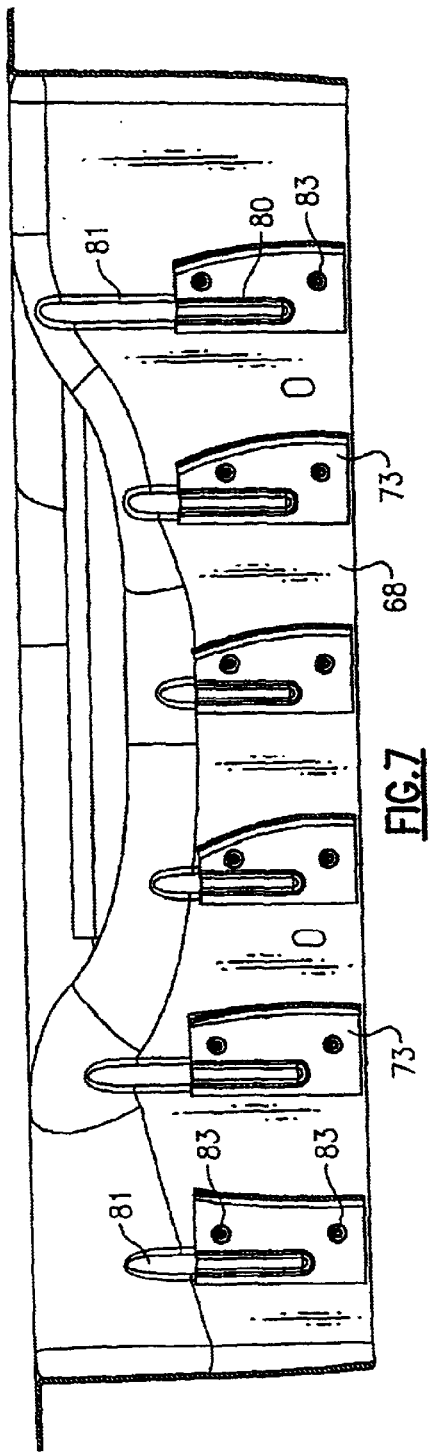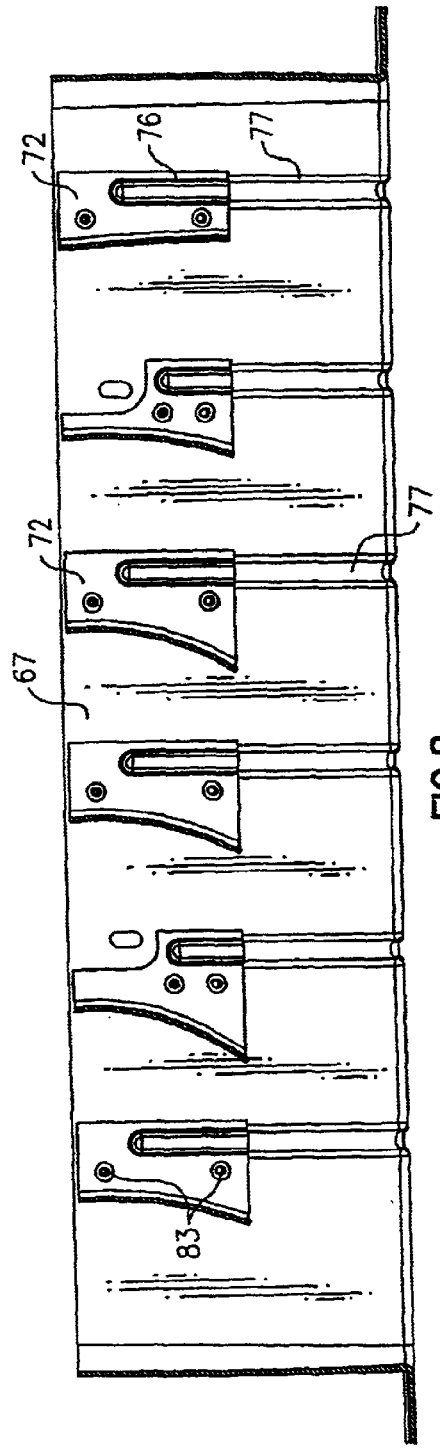

NOZZLE COVER

FIELD OF THE INVENTION

This invention relates generally to air conditioning, and, in particular, to air conditioning for a mobile temperature controlled container.

BACKGROUND OF THE INVENTION

More specifically, this invention relates to a mobile temperature controlled container for transporting perishable goods. As in most air conditioned containers of this type, the present air conditioning unit includes an open outdoor section and an enclosed indoor section. Space in this environment is in short supply and in an effort to save space, the component part of the indoor section is packed in an extremely limited amount of space. This, in turn, places an unwanted restriction upon the movement of air through this part of the unit, thus increasing the power consumption as well as increasing the air pressure resistance on the outdoor section of the unit.

Many prior art units used to service mobile containers do not effectively distribute the conditioned air throughout the container. As a result, the temperature in the container may vary between zones that are too cool and zones that are too warm. One primary reason for poor distribution of conditioned air is the inability of the air conditioned unit to "throw" the conditioned air over the length of the container. Another is the unit's inability to distribute conditioned air uniformly in both a vertical and a horizontal direction.

SUMMARY OF THE INVENTION

It is, therefore, an object of the present invention to improve air conditioning systems for servicing mobile temperature controlled containers of the type used to transport perishable goods and the like.

It is a further object of the present invention to improve the efficiency of an air conditioning unit for controlling the temperature within a mobile container.

A still further object of the present invention is to improve the air handling properties of an air conditioning system for providing conditioned air to a mobile container.

Another object of the present invention is to improve the air distribution characteristics of an air conditioning unit used to service a mobile temperature controlled container.

These and other objects of the present invention are attained by an air conditioning unit used to provide conditioned air to a mobile temperature controlled container having an improved efficiency and air handling capability without sacrificing valuable space. The present unit contains an outdoor section that is open to the surrounding ambient and an enclosed indoor section through which return air drawn from the container is conditioned by either heating or cooling the air and supplying the conditioned air back to the container. The indoor section contains a heat exchanger coil and a blower wheel mounted in an open sided compartment over the coil. The compartment includes a scroll-shaped lower section in which the blower wheel is mounted for rotation and an upper discharge section into which the blower wheel discharges conditioned air that is drawn through the coil. The open side of the compartment is closed by a cover having an air inlet opening located adjacent to the blower wheel and a discharge nozzle that is adjacent to the discharge section of the compartment. The nozzle is arranged to pass into the compartment and contains a series of flow deflector plates for enhancing the flow of conditioned air delivered into the container.

BRIEF DESCRIPTION OF THE DRAWINGS

For a better understanding of these and other objects of the invention, reference will be made to the following detailed description of the invention which is to be read in connection with the accompanying drawings, wherein:

FIG. 7 is a front view of the cover illustrated in FIG. 4;

FIG. 8 is an enlarged sectional view taken along lines 8—8 in FIG. 7 showing the vanes mounted with the outlet nozzle of the cover;

DETAILED DESCRIPTION OF THE INVENTION

Figure 1:
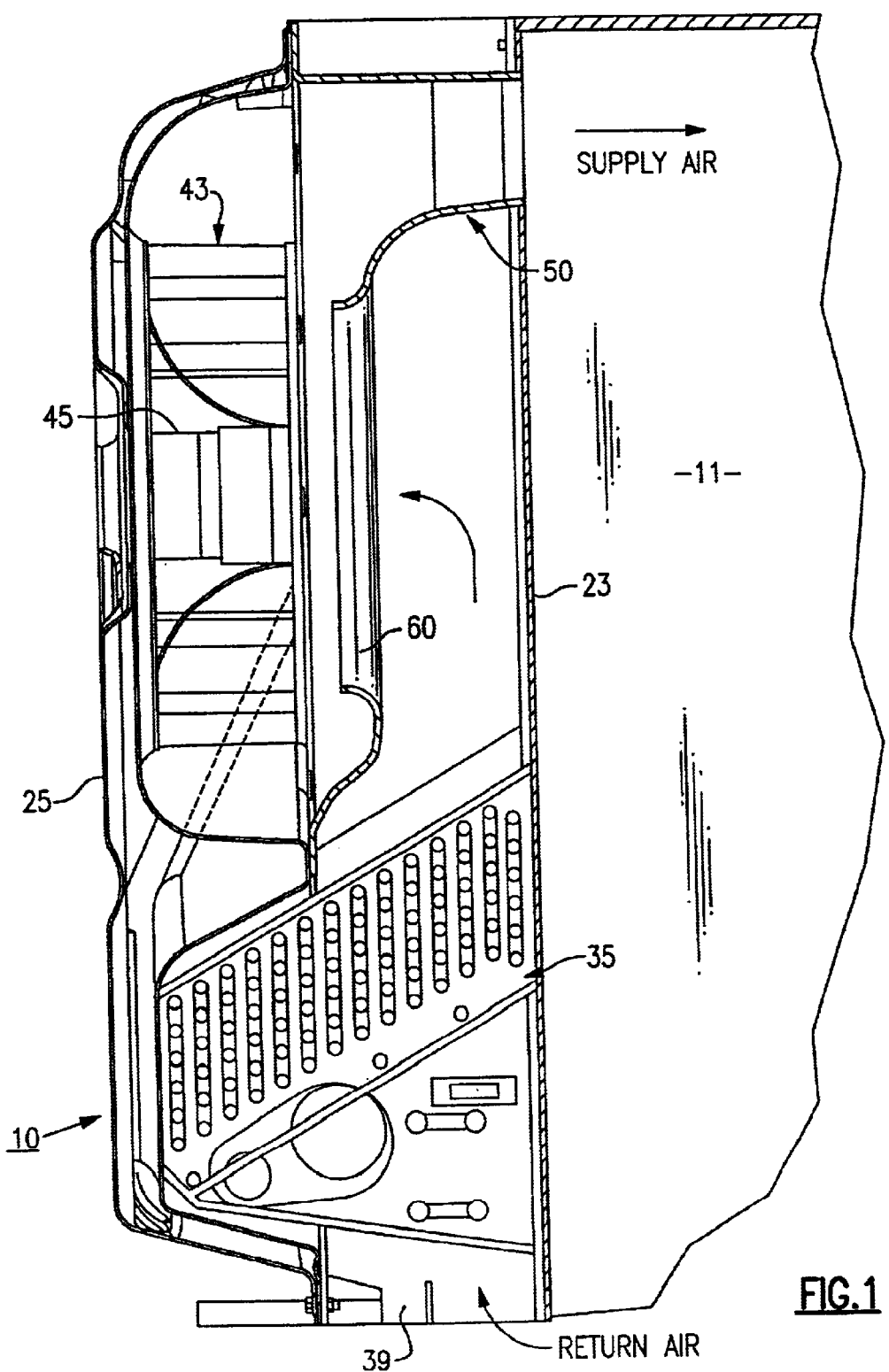
FIG. 1 is an enlarged side elevation of an evaporator housing embodying the teachings of the present invention.
Figure 2:
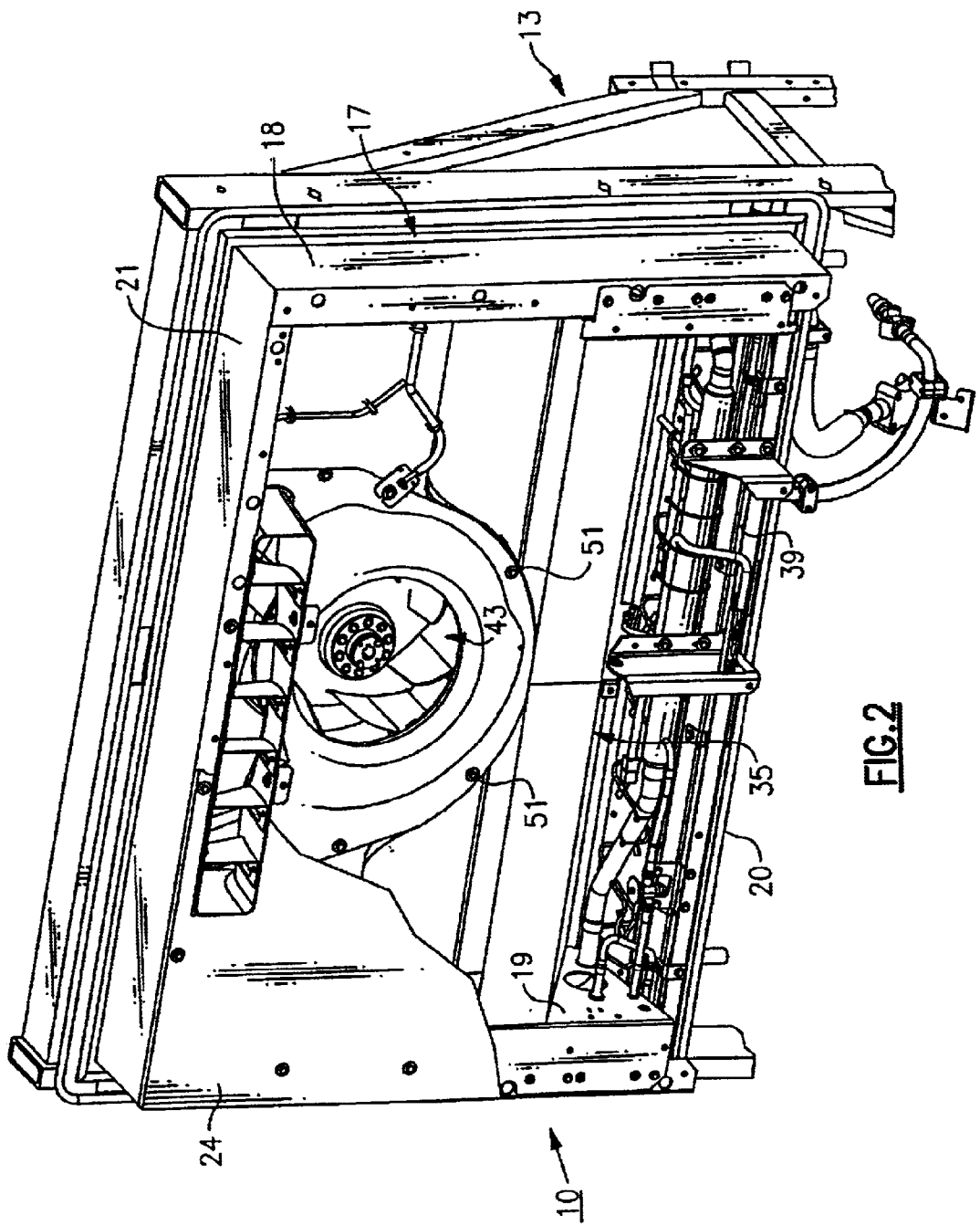
FIG. 2 is a rear perspective view of the evaporator housing with parts broken away to better illustrate the interior of the housing.

Referring now to FIGS. 1–9, there is illustrated the indoor section, generally referenced 10, of an air conditioning unit for delivering conditioned air to the interior of a mobile temperature controlled container 11. As viewed in FIG. 3, the indoor section and the outdoor section of the air conditioning unit are both mounted upon a frame 13 that is secured to the container adjacent to the container's front wall 14. As will be described in greater detail below, the indoor section of the unit includes a housing 15 through which air drawn from the container is conditioned to either heat or cool the air and the conditioned air is then returned to the container to maintain the container at desired temperature levels.

The indoor section 10 of the air conditioning unit includes a rectangular shaped frame 17 containing a pair of opposed side walls 18 and 19, a bottom wall 20 and a top wall 21. The rear face of the frame is closed by securing the rear of the frame directly to one wall 23 of the container as shown in FIG. 1 or by bolting a mounting plate 24 over the face of the frame, which, in turn, can be mounted upon a wall of the trailer which is preferably the front wall. The front of the frame is closed by means of a front wall that is generally referenced 25.

The front wall of the housing is preferably molded from a high strength plastic material having a low thermal conductivity so that the wall presents a barrier to the flow of heat into or out of the housing. The frame is also fabricated of a similar material so that the housing is a relatively well insulated structure. Two compartments are molded into the front wall of the indoor housing. The first is a heat exchanger compartment 27 located in the lower part of the wall and the second is a blower wheel compartment that is located in the wall directly over the lower compartment. Both compartments open into the interior region of the frame.

Figure 3:
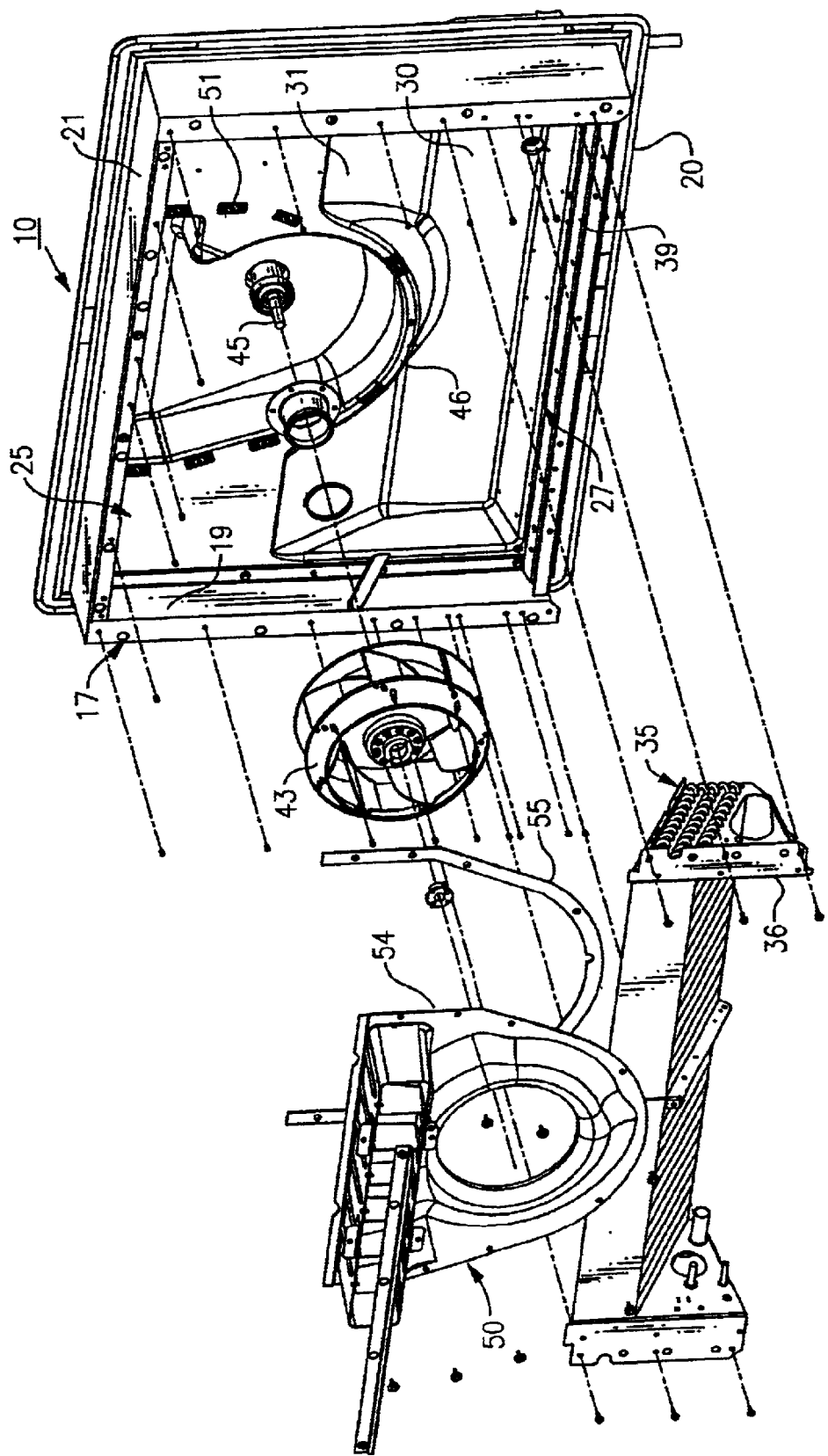
FIG. 3 is an exploded view showing the various components contained within the housing.
Figure 4:
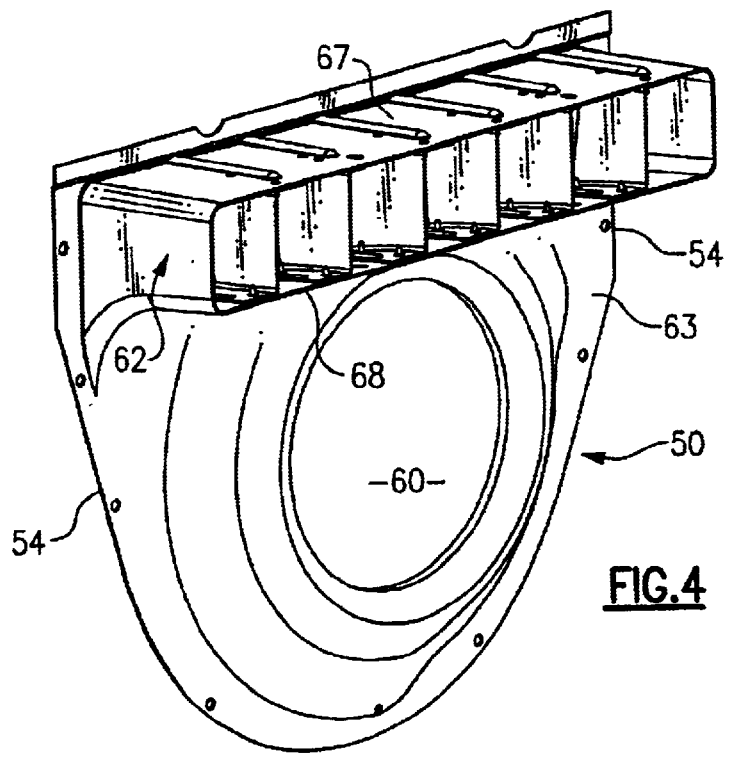
FIG. 4 is a rear elevation of the front wall cover of the evaporator housing.
Figure 5:
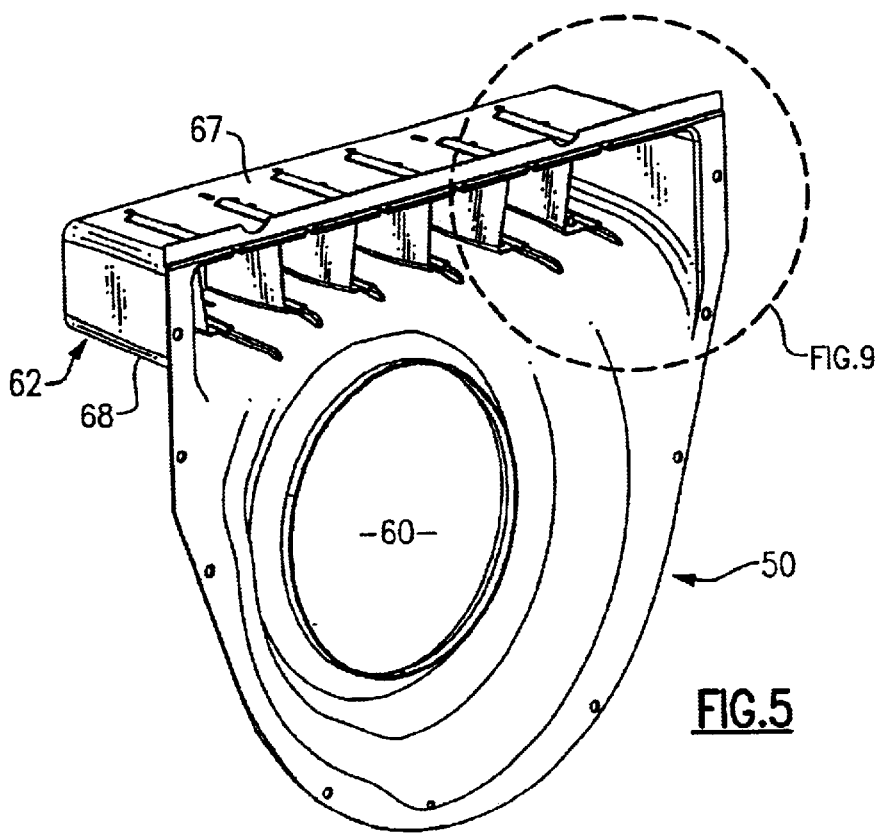
FIG. 5 is an enlarged front perspective view of a cover used to cover the open face of a blower wheel enclosure contained within the housing.
Figure 6:
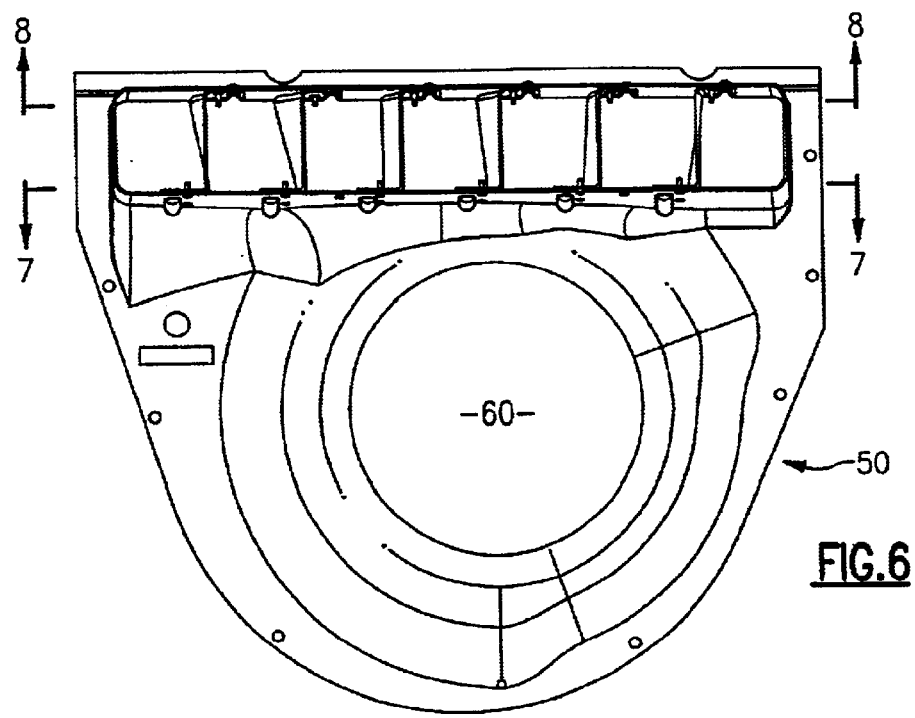
FIG. 6 is a rear perspective view of the cover illustrated in FIG. 5.
Figure 9:
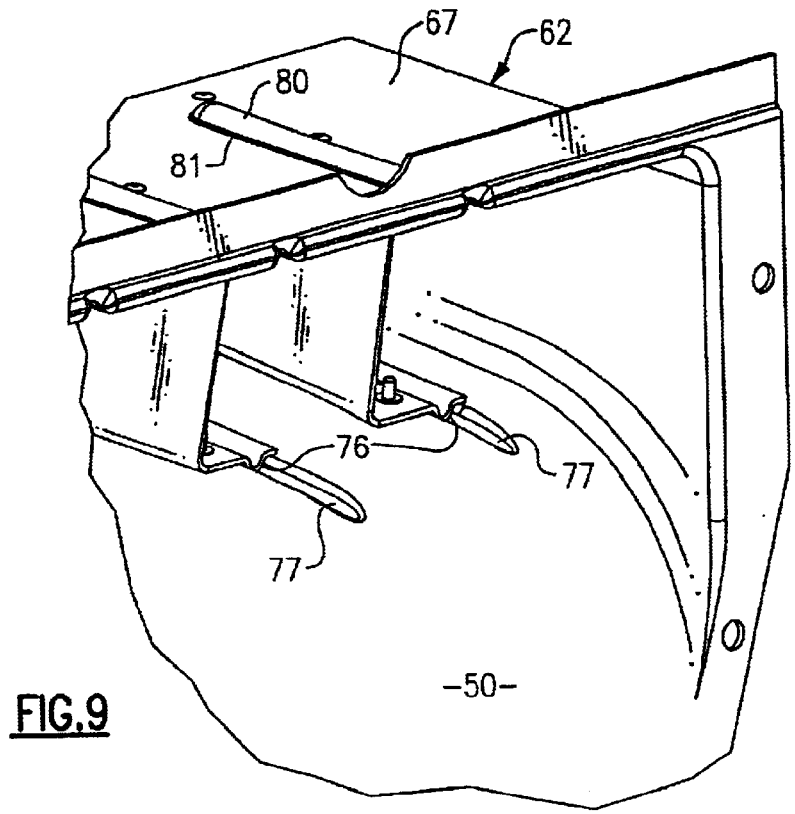
FIG. 9 is an enlarged sectional view taken along lines 9—9 in FIG. 7.

The lower heat exchanger compartment 27 has a rectangular-shaped bottom section 30 and an inwardly slanted top section 31 that blends into the blower wheel compartment as illustrated in FIG. 3. The floor 32 of the heat exchanger compartment is in coplaner alignment with the bottom wall of the frame 17. A heat exchanger 35 is mounted in a support bracket 36 (FIG. 3) and the assembly is placed inside the housing with a portion of the heat exchanger being located within the rectangular-shaped lower section of the heat exchanger compartment. The bottom wall of the frame contains an air inlet opening 39 that extends across the width of the frame beneath the heat exchanger through which return air from the container enters the housing. Although not shown, suitable duct work is provided for conducting return air from the container to the air inlet opening of the housing.

The blower wheel compartment includes a lower scroll-shaped section 40 that communicates directly with a rectangular-shaped discharge section 42. A blower wheel 43 is mounted for rotation upon a shaft 45 that passes into the scroll-shaped section 46 of the compartment. A portion of the scroll section of the compartment describes a spiral with the center of rotation of the spiral being coaxially aligned with the axis of the shaft. The shaft passes out of the compartment through the front wall and is coupled to a suitable drive (not shown) for turning the blower wheel at a desired speed.

The open side of the blower wheel compartment is closed by a cover 50 which is shown in greater detail in FIGS. 4–8. Threaded lugs 51—51 are molded into the front wall 25 of the housing. The lugs are arranged to receive threaded fasteners 53—53 that are passed through clearance holes 54—54 in the cover to secure the cover in place over the side wall opening of the blower wheel compartment.

A gasket 55 (FIG. 3) is placed between the cover and the front wall of the housing to prevent air from passing therebetween.

The cover includes a circular opening 60 formed therein. The opening is axially aligned with the central axis of the blower wheel. A rectangular shaped nozzle 62 is also provided in the cover and, in assembly, is located adjacent to the discharge section of the blower wheel compartment. The nozzle extends outwardly from the main body 63 of the cover and is adapted to pass through the wall 23 of the container. The blower wheel is designed to draw return air into the indoor housing through inlet 39 and then through the heat exchanger coil 35 wherein the air is conditioned. The air enters the blower through the circular inlet 60 that has an inwardly directed lip 65 that converges from the inlet opening toward the blower wheel. The conditioned air enters the wheel through its hub and the impeller blades increase the velocity of the flow and discharge of air into the entrance of the nozzle through the discharge region of the blower wheel compartment. The top wall 67 and the bottom wall 68 of the nozzle converge from the entrance region toward the exit region to further increase the velocity of the flow.

The nozzle 62 contains a series of flow deflector vanes generally referenced 70. Each vane is a Z-shaped member having a lower flange 72 that is connected to an upper flange 73 by a generally vertical web 75. Each lower flange contains an elongated detent 76 that is received in an elongated slot 77 formed in the bottom wall 68 of the nozzle. The upper flange of each deflector is similarly furnished with an elongated detent 80 that is received in an elongated slot 81 formed in the top wall 67 of the nozzle. The opposed flanges are secured to the walls of the nozzle by screws 83—83.

The webs of each individual deflector is tuned by adjusting the contour of the web so that the flow is directed into the container and is optimized so that the air flow is uniformly distributed both vertically and horizontally across the container. The discharge flow, in addition, exhibits improved flow throw characteristics when compared to similar prior art systems.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A cover for closing the open side of an enclosure having a spiral shaped section for rotatably housing a blower wheel and a discharge area into which the blower wheel discharges air, wherein said cover includes:

means for securing said cover to said enclosure for closing said open side thereof;

said cover having a first main body section that is positioned adjacent to said blower wheel and a second nozzle section that is positioned adjacent to said discharge area;

said first section of the cover containing an air inlet opening through which air is drawn into the enclosure wherein said nozzle section extends outward from the front of said main body section of the cover and has a rectangular cross sectional area, and a series of stationary, vertically disposed vanes are mounted between a top wall and bottom wall of the nozzle section in a spaced apart relationship across the nozzle wherein each vane further includes a pair of parallel, spaced apart flanges that are co-joined by a vertically disposed web and means for securing a first flange to the top wall of said nozzle section and a second flange to a bottom wall of said nozzle section and wherein said flanges each contain an outwardly disposed elongated detent that is received in a slotted opening formed in the top and bottom walls of the nozzle.

2. The cover of claim 1 wherein the web of each vane is turned to optimize the throw and distribution of supply air discharged from the nozzle section.

3. The cover of claim 1 wherein the nozzle section has a top wall and a bottom wall that converges from an air entrance region to the nozzle section toward an air exit region of said nozzle section.

* * * * *